(12) United States Patent
Thrush et al.

(10) Patent No.: US 12,416,334 B1
(45) Date of Patent: Sep. 16, 2025

(54) TORQUE PROTECTION FOR STRAIN WAVE DRIVES

(71) Applicant: Agility Robotics, Inc., Pittsburgh, PA (US)

(72) Inventors: Dylan Thrush, Albany, OR (US); Kevin Sweeney, Albany, OR (US)

(73) Assignee: Agility Robotics, Inc., Pittsburgh, PA (US)

( * ) Notice: Subject to any disclaimer, the term of this patent is extended or adjusted under 35 U.S.C. 154(b) by 494 days.

(21) Appl. No.: 17/891,954

(22) Filed: Aug. 19, 2022

(51) Int. Cl.
*F16D 7/02* (2006.01)
*B25J 9/10* (2006.01)
*B25J 9/12* (2006.01)

(52) U.S. Cl.
CPC ............ *F16D 7/025* (2013.01); *B25J 9/1025* (2013.01); *B25J 9/126* (2013.01)

(58) Field of Classification Search
CPC ................................ F17D 7/025; B25J 9/1025
See application file for complete search history.

(56) References Cited

U.S. PATENT DOCUMENTS

| | | | |
|---|---|---|---|
| 10,337,561 | B2 | 7/2019 | Jackowski et al. |
| 10,655,684 | B2 | 5/2020 | Jackowski et al. |
| 2020/0256399 | A1 | 8/2020 | Jackowski et al. |
| 2023/0287941 | A1 * | 9/2023 | Dellon ................... B25J 9/1025 |

FOREIGN PATENT DOCUMENTS

| | | | |
|---|---|---|---|
| DE | 102012104119 B4 * | 10/2019 | ......... B60G 21/0555 |
| JP | 09145497 A * | 6/1997 | |

* cited by examiner

*Primary Examiner* — Bobby Rushing, Jr.

(57) ABSTRACT

A torque-limiting actuator assembly includes a transmission coupled to a housing and a motor. The transmission includes an input member, an intermediate member, and an output member, all rotatable around a common axis. The input member is coupled to the motor and is configured to engage the intermediate member that engages the output member and causes it to rotate at a predictable rate. The intermediate member is configured to rotate if the output member experiences torque greater than a torque limit.

17 Claims, 7 Drawing Sheets

TORQUE PROTECTION FOR STRAIN WAVE DRIVES

BACKGROUND

The present disclosure relates generally to motors and transmissions used in robotics applications. More specifically, it relates to a system and method of protecting a strain wave drive from damage when the output is over-torqued.

The number and variety of use-cases for robots has accelerated at a rapid pace. Long used in the automotive manufacturing industry, the recent global pandemic has encouraged many industries to explore new applications for automation. While some robots are stationary and have an arm that performs some task, other robots are mobile and can move about a workspace either on wheels or on legs in the performance of their work.

Movement of robot limbs can be accomplished via pneumatics, hydraulics, and electric motors, to name a few. When using electric motors, the motor has an output shaft that spins at a high rate of speed when the motor is energized. To be useful in a work context, the rotational speed needs to be decreased, while at the same time, the torque needs to be increased. This is accomplished through the use of a transmission, such as a strain wave drive. Collectively, the motor and the transmission are combined into a single device called an actuator.

When designing robots that have limbs extending away from the body and are designed to manipulate real-world objects, it is possible that a force will be applied to one of the limbs that is greater than expected. When such a force is applied and exceeds the maximum amount of torque that can be handled by the gear head of the actuator, the transmission breaks. What is needed, then, is a way to protect the transmission in the event it becomes over-torqued.

BRIEF SUMMARY

In one aspect, a torque-limiting actuator assembly includes a housing, a motor affixed to the housing, the motor having a shaft that rotates at a first velocity. A transmission is coupled to the housing and the motor, the transmission includes an input member, an intermediate member, and an output member, the members rotatable around a common axis. The input member of the transmission is coupled to the shaft and configured to engage the intermediate member. The intermediate member is configured to also engage the output member and cause it to rotate at a second velocity slower than the first velocity, where the intermediate member is configured to selectively rotate.

In another aspect, a robot has at least one limb and includes a motor having a drive shaft and being configured to move the at least one limb of the robot. A transmission includes an input member rotatably coupled to the drive shaft, a selectively fixed intermediate member, and an output member rotatably engaged with the intermediate member, whereby rotation of the input member by the drive shaft causes rotation of the output member at a slower speed. The transmission includes a slip clutch frictionally engaged with the intermediate member, the slip clutch defining a torque limit that defines a torque load on the output member that causes the intermediate member to rotate relative to the slip clutch, where the output member is coupled to the limb of the robot.

In a further aspect, a method of protecting an actuator assembly from damage is disclosed. The method includes providing an actuator having a housing, a motor disposed within the housing and having a drive shaft that rotates at an input speed, and a transmission assembly disposed within the housing. The transmission assembly includes an input member, an intermediate member, and an output member, the input member rotatably coupled with the drive shaft whereby rotation of the input member at the input speed interacts with the intermediate member to cause the output member to rotate at a reduced speed compared to the drive shaft speed. The output member is configured to provide torque up to a torque limit and the method further includes holding the intermediate member fixed so long as the torque on the output member is below the torque limit, and permitting the intermediate member to rotate in the event the torque on the output member exceeds the torque limit.

BRIEF DESCRIPTION OF THE SEVERAL VIEWS OF THE DRAWINGS

The accompanying drawings, which are incorporated in and form a part of the specification, illustrate the embodiments of the invention and together with the written description serve to explain the principles, characteristics, and features of the invention.

While implementations of the disclosed inventions are described herein by way of example, those skilled in the art will recognize that they are not limited to the embodiments or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are not meant to be used to limit the scope of the description or the claims.

DETAILED DESCRIPTION

Figure 1:
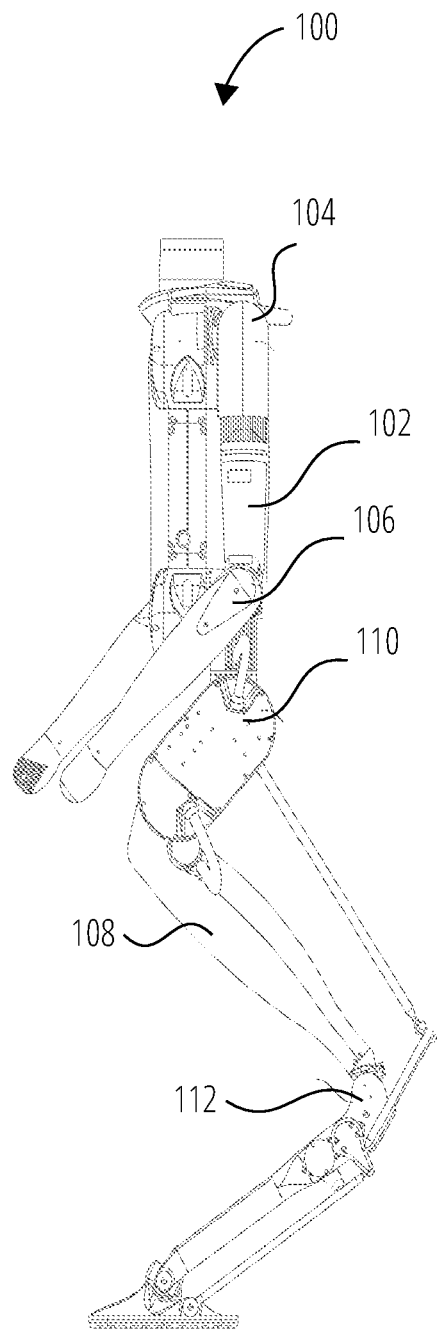
FIG. 1 is an illustration of a robot that may use an embodiment of a clutched strain wave drive.

In the following description, for purposes of explanation, numerous specific details are set forth in order to provide a thorough understanding of example embodiments. It will be evident to one skilled in the art, however, that embodiments can be practiced without these specific details. While certain components are shown in block diagram form to describe one or more aspects, it is to be understood that functionality performed by a single component can be performed by multiple components. Similarly, a single component can be configured to perform functionality described as being performed by multiple components. In some instances, well-known methods or components have not been described in detail so that the details of the present invention are not obfuscated.

In the interest of clarity, some routine features of the implementations described herein are omitted. It will be appreciated that in the development of any actual implementation of the present invention, certain decisions must be made in order to achieve specific goals, and that different decisions may be made to achieve different goals without departing from the teachings of the invention. While certain implementations might be complex and time-consuming, they would nevertheless be routine to accomplish for those of ordinary skill in the art having the benefit of this disclosure.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example will not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Strain wave drives, also called harmonic drives, are used in robotics to reduce the speed of rotation of an input shaft connected to the output of a motor and increase the torque or force that can be applied to a workpiece via the slower, controlled rotation of an output shaft. These drives are reversible and have very little backlash, so they are very popular in robotic applications. The workpiece is often a limb of a robot, such as an arm or a leg.

With reference to FIG. 1, in certain embodiments, the robot could be bipedal robot 100 of FIG. 1 and movement of the arm 102 the workpiece could be shoulder joint 104 or elbow joint 106. In other embodiments, movement of a leg 108 could be the hip joint 110 or ankle joint 112 as the workpiece.

Figure 2:
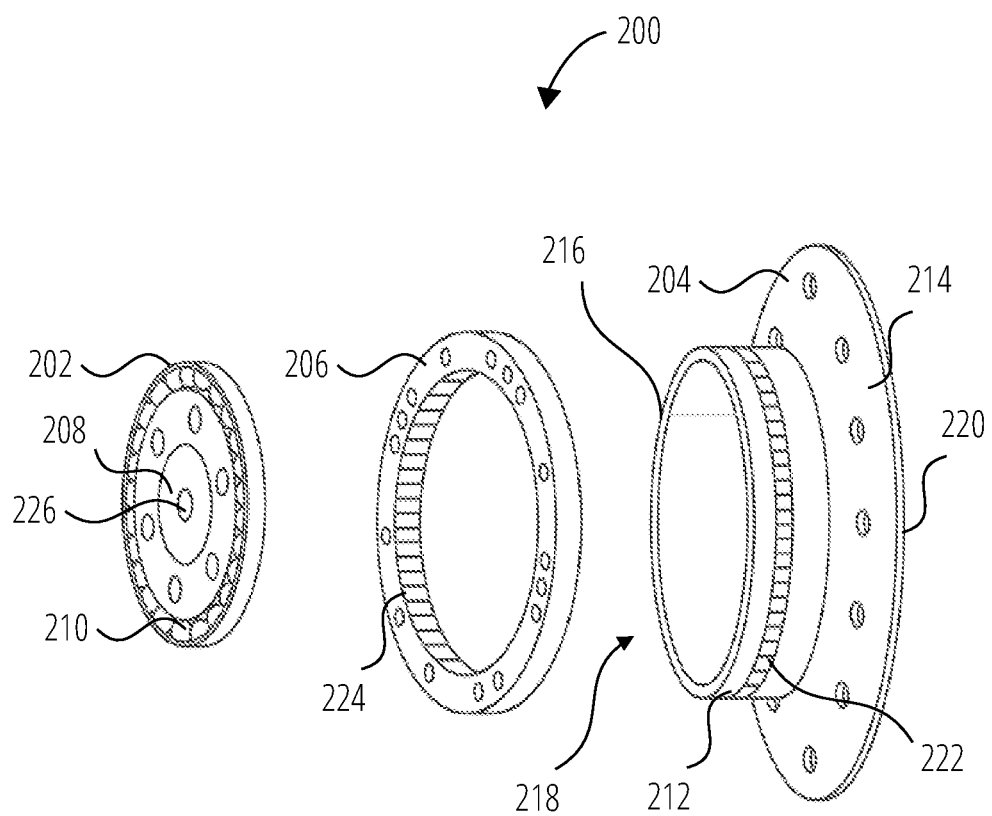
FIG. 2 is an exploded view of a strain wave drive as is known in the art.

Referring now to FIG. 2, a strain wave drive 200 consists of three elements: a wave generator 202, a flexspline 204, and a circular spline 206. The wave generator 202 consists of an elliptical shaft 208 and a ball bearing race 210. The elliptical shaft 208 is fitted within a ball bearing race 210, which causes the ball bearing race 210 to take on the shape of the elliptical shaft 208, although the elliptical shaft 208 is able to rotate within the ball bearing race 210.

The flexspline 204 has a cup portion 212 and a bottom portion 214. The cup portion 212 has a thin wall 216 that is radially deformable at an open end 218, distal to the bottom portion 214. In certain strain wave drive embodiments, such as is illustrated in FIG. 2, the bottom portion 214 creates a flange 220 that extends outward from the cup portion 212. The flange 220 is comparatively stiffer than thin wall 216 in order to support attachment to workpieces or additional shafts. External gear teeth 222 or in some embodiments, splines, project outward from an outside circumference of the open end 218 of the cup portion 212. The open end 218 of the cup portion 212 is sized to receive the wave generator 202 and the elliptical shaft 208 is able to rotate independently of the cup portion 212.

Strain wave drives include a third component called a circular spline 206. The circular spline 206 is a rigid ring that has internal gear teeth 224. The wave generator 202 and the open end 218 of the cup portion 212 of the flexspline 204 are sized to fit within the circular spline 206 so that the gearing external gear teeth 222 of the flexspline 204 periodically mesh with the internal gear teeth 224 of the circular spline 206 as the wave generator 202 rotates as will be more fully described.

In operation, an electromechanical actuator outfitted with a strain wave drive 200 has a motor that rotates an output shaft 226 at a first velocity. The output shaft 226, in turn, rotates wave generator 202 at the same rotational speed. As the elliptical wave generator 202 rotates, it causes the external gear teeth 222 of the flexspline 204 to mesh with the internal gear teeth 224 of the circular spline 206 in two regions approximately one hundred eighty degrees apart from each other on opposite radial sides of the wave generator 202. The strain wave drive 200 is designed so that the flexspline 204 has a number of external gear teeth 222 that is less than the number of internal gear teeth 224 of the circular spline 206. As a result, rotation of the wave generator 202 in a first direction at a first speed causes rotation of the circular spline 206 in the opposite direction relative to the rotation of the flexspline 204 at a greatly reduced velocity, although with much greater torque. In certain embodiments, there may be two fewer external gear teeth 222 than internal gear teeth 224. Assuming the circular spline 206 is free to rotate, when the wave generator 202 is driven at a first velocity, the circular spline 206 will rotate in the opposite direction at a second velocity that is a small percentage of the first velocity, depending on the total number of teeth.

In certain embodiments, the flexspline 204 is fixed in place, such as being rigidly attached to an actuator housing, so that rotation of the wave generator 202 is efficiently converted to reverse rotation of the circular spline 206. The circular spline 206, in this embodiment, becomes the output of the strain wave drive 200 and rotates at a reduced rate and increased torque depending on the difference between the number of external gear teeth 222 on the flexspline 204 and the number of internal gear teeth 224 on the circular spline 206. Typically, the circular spline 206 is rotationally fixed to a workpiece, such as a limb of a robot.

In other embodiments, the circular spline 206 is fixed in place and the flexspline 204 is permitted to rotate in response to the rotation of the wave generator 202. In this embodiment, the flexspline 204 becomes the output of the strain wave drive 200 and is used as the output to be connected to a workpiece.

While an electromechanical actuator employing a strain wave drive as described above has many benefits, the drive can still be broken. A robotic limb driven to move by an actuator with a strain wave drive may cause the drive to break if the limb encounters an obstacle that abruptly stops it while the drive is still fully engaged to move the limb. Likewise, if a limb is energized to lift an object that requires more torque than the actuator can provide, the drive may break because the teeth in either the flexspline or the circular spline may break. One way to protect the drive is to allow some portion of the drive to slip in the event the output is torqued over some baseline level or torque limit.

Figure 3:
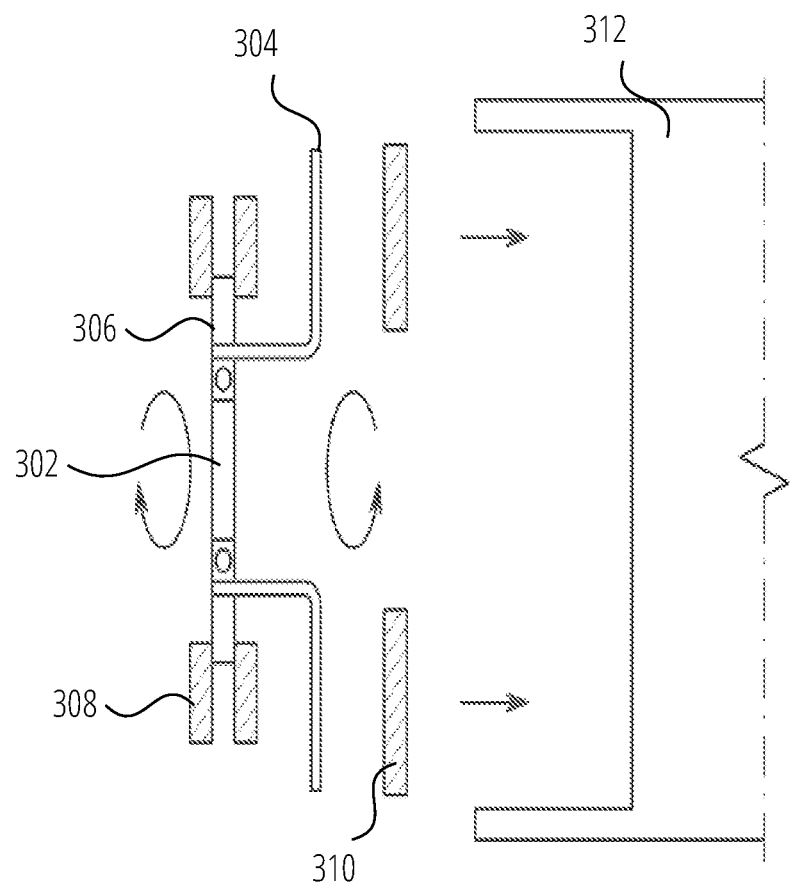
FIG. 3 is a simplified cross-sectional illustration of an implementation of a strain wave drive that is known in the art.

Referring now to FIGS. 2 and 3, a simplified diagram representing a cross-sectional view of a clutched strain wave drive known in the art is illustrated. Wave generator 302 spins at a first velocity in a first rotational direction and causes gearing teeth, such as external gear teeth 222, on the flexspline 304 to engage gearing teeth, such as internal gear teeth 224, on the circular spline 306. Because the circular spline 306 is fixed to the housing 308 or some other stationary element, the flexspline 304 rotates in a direction opposite the wave generator 302. To protect against damage to the teeth 222, 224, clutch pad 310 is pressed against the flexspline 304 at the output to allow it to slip in the event that the workpiece 312, such as a robot limb, encounters an unexpected torque event, such as an over-torque. If the drive, such as strain wave drive 200, is engaged and driving an output that is suddenly over-torqued, the flexspline 304 is able to slip against the clutch pad 310, which protects the drive. In a related alternative known embodiment, the flexspline 304 is fixed and the circular spline 306 is the output that rotates in response to the rotary input of the wave generator 302. In that embodiment, one or more clutch pads 310 are again used to permit the circular spline 306 to slip or rotate in relation to the workpiece at the output.

Figure 4:
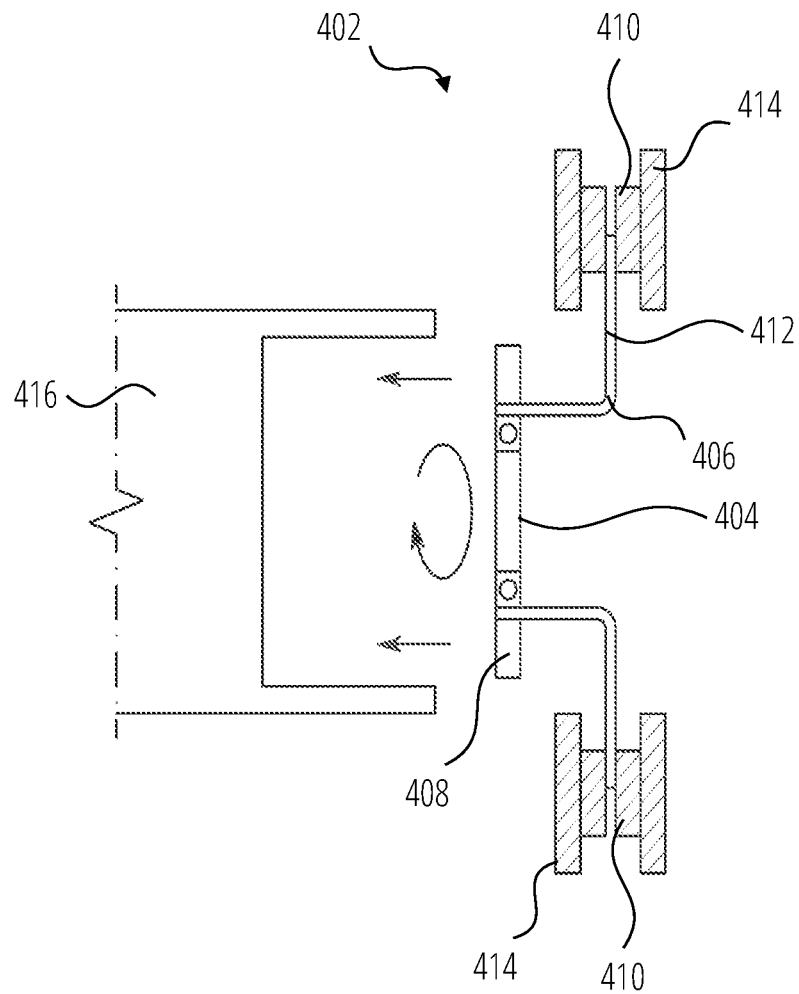
FIG. 4 is a simplified cross-sectional illustration of an implementation of a strain wave drive in accordance with an embodiment.

An embodiment of a new way to protect a strain wave drive with a slip clutch, but without directly clutching the drive component connected to the workpiece is disclosed. With reference to FIGS. 2 and 4, a simplified cross-section of an embodiment of a clutched strain wave drive 402 is illustrated. A wave generator 404 is rotated at motor output speed as previously described. The wave generator 404 causes gearing teeth, such as external gear teeth 222, on the flexspline 406 to engage teeth, such as internal gear teeth 224, on the circular spline 408 and rotate the circular spline 408 in the same rotary direction as the wave generator 404. Notably, instead of providing clutch pads on the output element, which, in this embodiment, is the circular spline 408, the fixed element is clutched.

In an embodiment, the flexspline 406 is fixedly held stationary through one or more clutch pads 410 that are biased to press against the flange 412 of the flexspline 406 to frictionally immobilize it up to a torque limit. The clutch pads 410 are also attached to some stationary surface, such as the actuator housing 414. In the event the circular spline 408 encounters a torque from the workpiece 416 that exceeds the torque limit, the torque is transmitted through the teeth on the circular spline 408 to the teeth on the flexspline 406. Instead of breaking the drive, however, the flexspline 406 is configured to slip against the one or more clutch pads 410 that are biased against the flexspline 406. While FIG. 4 has been simplified, those of skill in the art will recognize that there will be other items between the housing 414 and the flange 412, such as presser plates, spacers, washers, spring washers, or the like that will enable the one or more clutch pads 410 to operate as intended.

Figure 5:
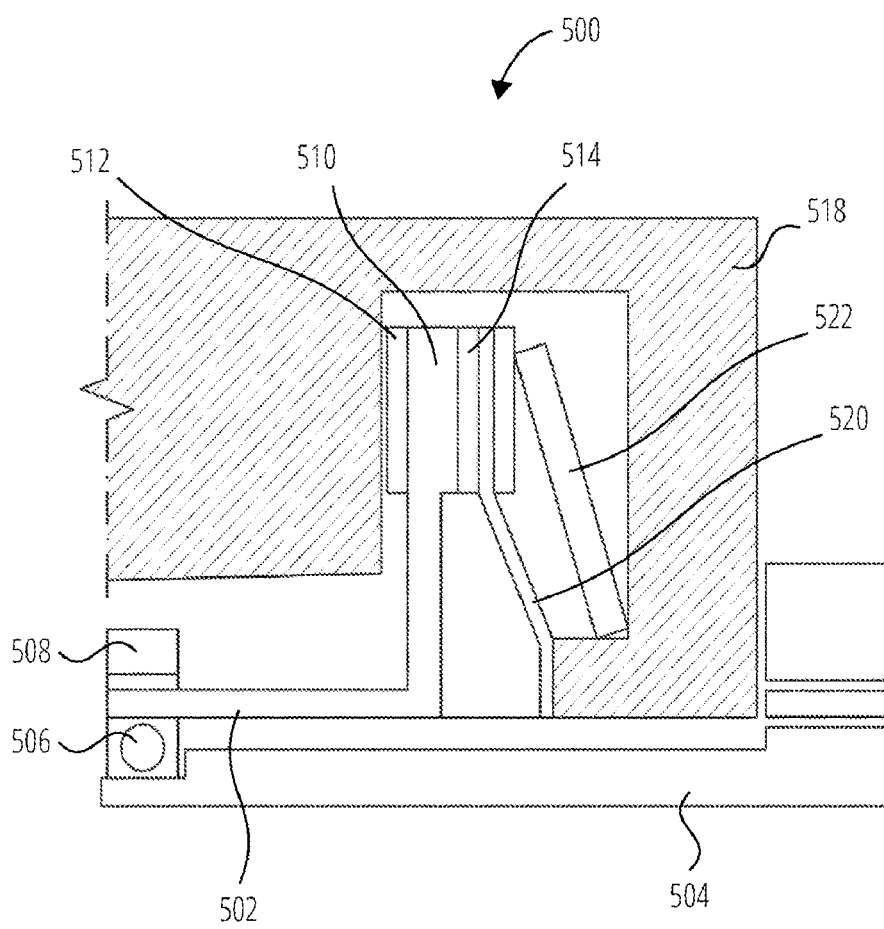
FIG. 5 is a close-up cross-sectional illustration of a portion of an actuator constructed in accordance with an embodiment.

FIG. 5 is a close-up cross-sectional view of a portion of an electromechanical actuator 500 having a clutched flexspline 502 as described in FIG. 4. An input shaft 504 driven by the motor drives a wave generator 506 so that it has a rotational velocity, which, as discussed above, causes teeth on the flexspline 502 to selectively engage teeth on the circular spline 508 whereby the circular spline 508 rotates at a much slower rate in the same direction as the wave generator 506 and can rotate a workpiece. In embodiments, flange 510 is held in a fixed position by a first clutch pad 512 that is affixed to the housing 518 and a second clutch pad 514 that is biased against the flange 510 with one or more of a torque washer 520 and a spring washer 522, such as a Belleville spring. The amount of pressure applied to the flange 510, as well as the friction applied by the clutch pad material to the flange 510 are both factors in determining the torque limit, above which, the flexspline 502 is permitted to protectively slip against the clutch pads 512, 514 in response to a torque experienced by the circular spline 508.

Figure 6:
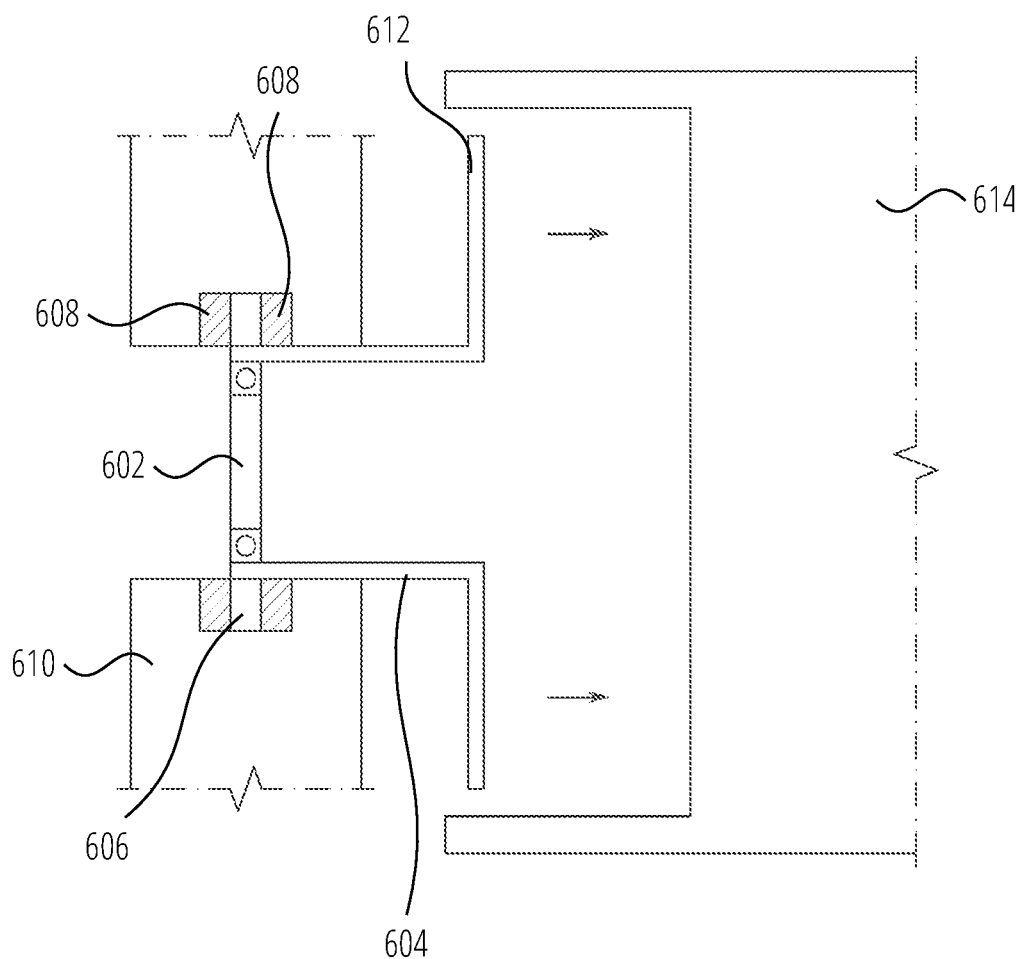
FIG. 6 is a simplified cross-sectional illustration of an implementation of a strain wave drive constructed in accordance with an embodiment.
Figure 7:
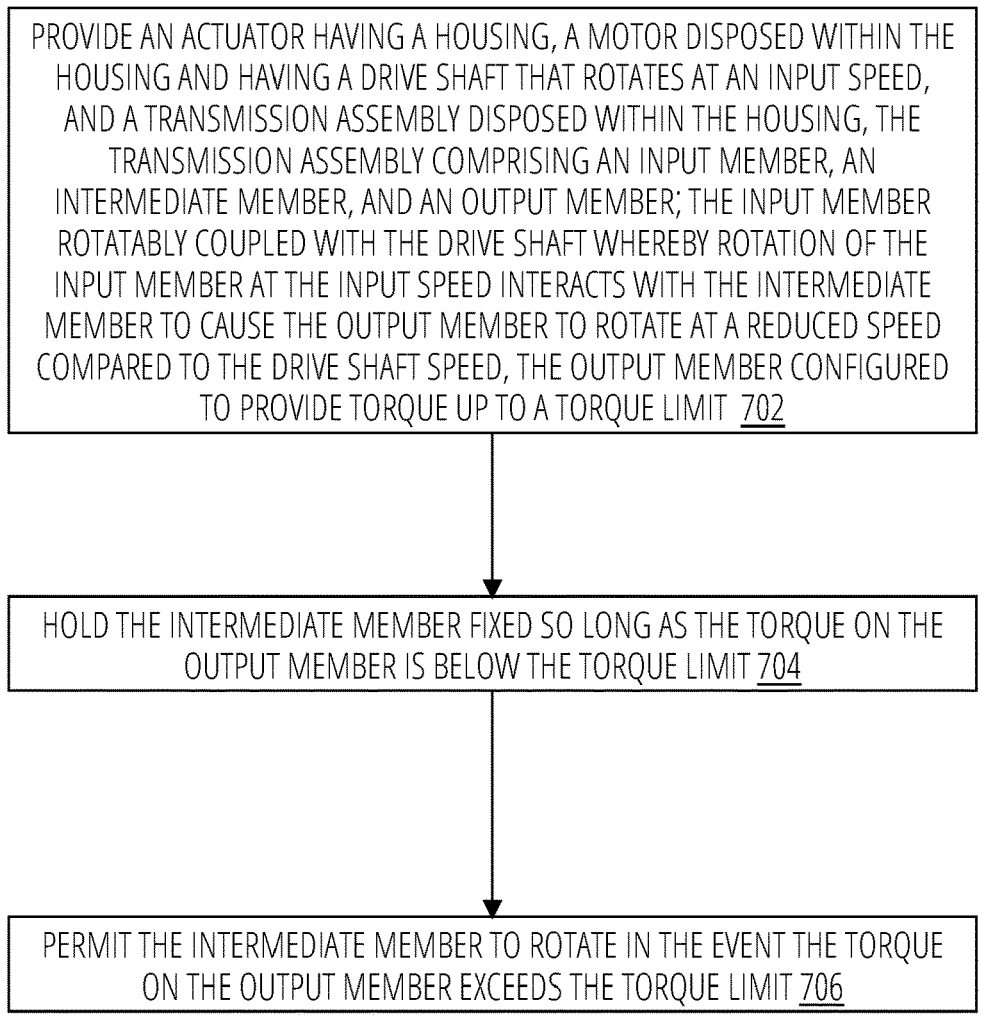
FIG. 7 illustrates a routine 700 in accordance with one embodiment.

FIG. 6 is a simplified cross-sectional illustration of another embodiment of a torque-limiting strain wave drive. A wave generator 602 is connected to an input shaft (not shown) that spins at a motor output speed and causes the flexspline 604 to selectively engage the circular spline 606 in the manner previously described. In this embodiment, however, the circular spline 606 is held stationary by one or more clutch pads 608 that are disposed on the housing 610 and which define a torque limit, below which the circular spline 606 will be immobilized. The inability of the circular spline 606 to rotate means the flexspline 604 will rotate in the opposite direction with reduced rotational velocity and increased torque as compared to the wave generator 602. The flange 612 of the silk hat style flexspline 604 transmits the output to the workpiece 614.

Under normal operation, the flexspline 604 will be able to deliver a certain amount of torque to the workpiece 614. To the extent an amount of torque is called for that exceeds the torque limit defined by the friction of the clutch pads 608, both the flexspline 604 and the circular spline 606 will be permitted to rotate to protect the drive from breakage.

In step 702, routine 700 provides an actuator having a housing, a motor disposed within the housing and having a drive shaft that rotates at an input speed, and a transmission assembly disposed within the housing, the transmission assembly comprising an input member, an intermediate member, and an output member; the input member rotatably coupled with the drive shaft whereby rotation of the input member at the input speed interacts with the intermediate member to cause the output member to rotate at a reduced speed compared to the drive shaft speed, the output member configured to provide torque up to a torque limit. In step 704, routine 700 holds the intermediate member fixed so long as the torque on the output member is below the torque limit. In step 706, routine 700 permits the intermediate member to rotate in the event the torque on the output member exceeds the torque limit.

It will be apparent to those of skill in the art that while a "silk hat" version of a strain wave drive is used herein for purposes of illustration, the principles of operation will easily transfer to a "cup" style drive having a cup-shaped flexspline. To the extent that the circular spline is the output and a "cup" style flexspline is clutched, an embodiment could include a single clutch pad biased against the base of the "cup" rather than sandwiching a portion of the flexspline as is illustrated in FIGS. 3 and 4.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

What is claimed is:
1. A torque-limiting actuator assembly comprising
a housing;

a motor affixed to the housing; the motor having a shaft that rotates at a first velocity;

a transmission coupled to the housing and the motor, the transmission comprising an input member, an intermediate member, and an output member, the members rotatable around a common axis;

the input member coupled to the shaft and configured to engage the intermediate member; the intermediate member configured to also engage the output member and cause it to rotate at a second velocity slower than the first velocity; and a slip clutch including one or more clutch pads, wherein the intermediate member is held stationary by a slip clutch, wherein the intermediate member comprises a body having a flange engaged by the slip clutch, and wherein the intermediate member is held stationary by the one or more clutch pads up to a torque limit and configured to slip against the one or more clutch pads when torque exceeds the torque limit.

2. The torque-limiting actuator assembly of claim 1, wherein the intermediate member is configured to slip against the one or more clutch pads when the output member experiences torque greater than the torque limit.

3. The torque-limiting actuator assembly of claim 1, wherein the slip clutch comprises a first clutch pad engaged with a first side of the flange and a second clutch pad engaged with a second side of the flange, whereby the clutch pads releasably hold the intermediate member in a fixed position.

4. The torque-limiting actuator assembly of claim 3, wherein the clutch pads frictionally hold the intermediate member in the fixed position.

5. The torque-limiting actuator assembly of claim 3, wherein the slip clutch allows the intermediate member to rotate when the torque applied to it by the output member exceeds a torque limit.

6. The torque-limiting actuator assembly of claim 3, wherein the first clutch pad is coupled to the housing.

7. The torque-limiting actuator assembly of claim 3, further comprising a spring washer coupled to the housing, the spring washer configured to cause the second clutch pad to engage the second side of the flange.

8. The torque-limiting actuator assembly of claim 1, wherein the transmission is a strain wave drive the input member is a wave generator, the intermediate member is a flexspline, and the output member is a circular spline.

9. A robot having at least one limb, the robot comprising:
a motor disposed on the robot, the motor having a drive shaft and being configured to move the at least one limb of the robot;

a transmission comprising an input member rotatably coupled to the drive shaft, an intermediate member held stationary by one or more clutch pads biased against a flange of the intermediate member up to a torque limit, and an output member rotatably engaged with the intermediate member, whereby rotation of the input member by the drive shaft causes rotation of the output member at a slower speed;

wherein the intermediate member is configured to slip against the one or more clutch pads when torque from the output member exceeds the torque limit;

wherein the output member is coupled to the at least one limb of the robot.

10. The robot of claim 9, wherein the intermediate member comprises a body having a flange, the flange having a first side and a second side, wherein both sides are engaged by the one or more clutch pads.

11. The robot of claim 9, wherein the one or more clutch pads comprises at least one clutch pad having a first side and a second side, the first side frictionally engaged with the intermediate member and the second side fixedly disposed on a housing.

12. The robot of claim 9, wherein the one or more clutch pads comprises a first clutch pad mechanically biased against the flange of the intermediate member, wherein the first clutch pad frictionally engages the intermediate member and causes the intermediate member to frictionally engage a second clutch pad, whereby the intermediate member is immobilized until the torque limit is exceeded.

13. The robot of claim 9, wherein the transmission is a strain wave drive the input member is a wave generator, the intermediate member is a flexspline, and the output member is a circular spline.

14. A method of protecting an actuator assembly from damage, the method comprising providing an actuator having a housing, a motor disposed within the housing and having a drive shaft that rotates at an input speed, and a transmission assembly disposed within the housing, the transmission assembly comprising an input member, an intermediate member, and an output member; the input member rotatably coupled with the drive shaft whereby rotation of the input member at the input speed interacts with the intermediate member to cause the output member to rotate at a reduced speed compared to the drive shaft speed, the output member configured to provide torque up to a torque limit;

holding the intermediate member stationary by one or more clutch pads biased against a flange of the intermediate member so long as the torque on the output member is below the torque limit;

permitting the intermediate member to slip against the one or more clutch pads when the torque on the output member exceeds the torque limit.

15. The method of claim 14, wherein the transmission assembly is a strain wave drive.

16. The method of claim 14, wherein the output member is fixedly attached to a workpiece.

17. The method of claim 16, wherein the workpiece is a limb of a robot.

* * * * *